March 19, 1946. W. D. CALLAN 2,396,826
AIR CONDUIT
Filed Jan. 26, 1942 2 Sheets-Sheet 2
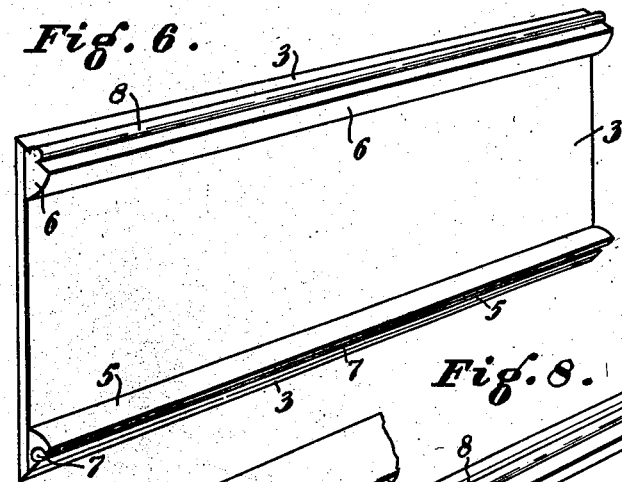
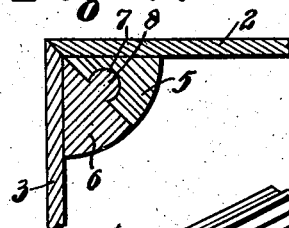
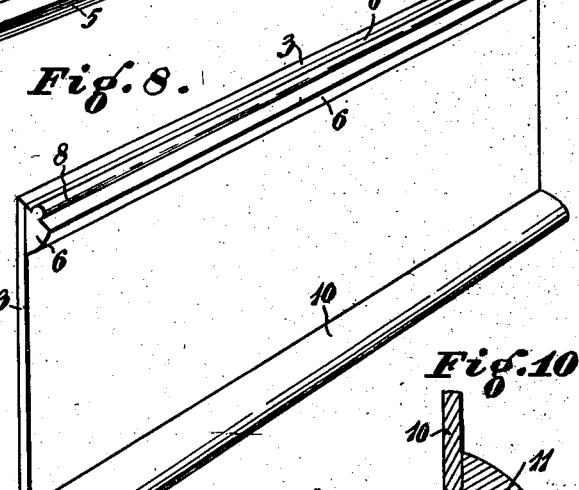
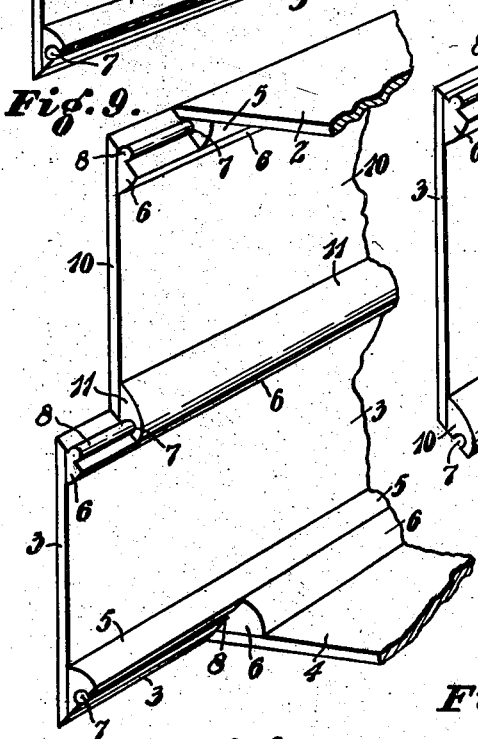
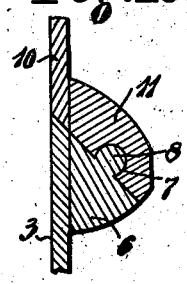
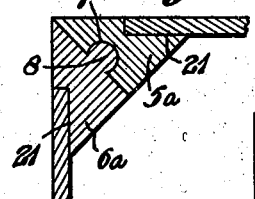
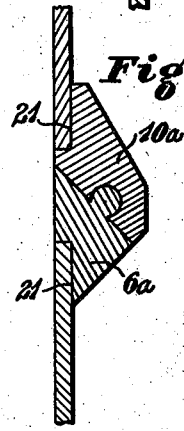
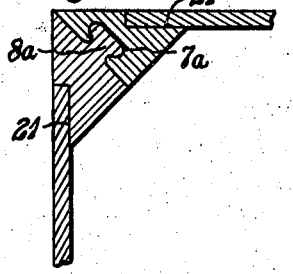
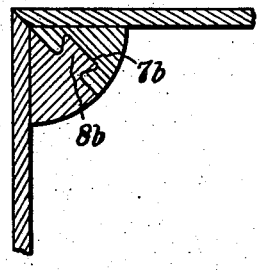
INVENTOR.
WILLIAM D. CALLAN
BY
ATTORNEY.

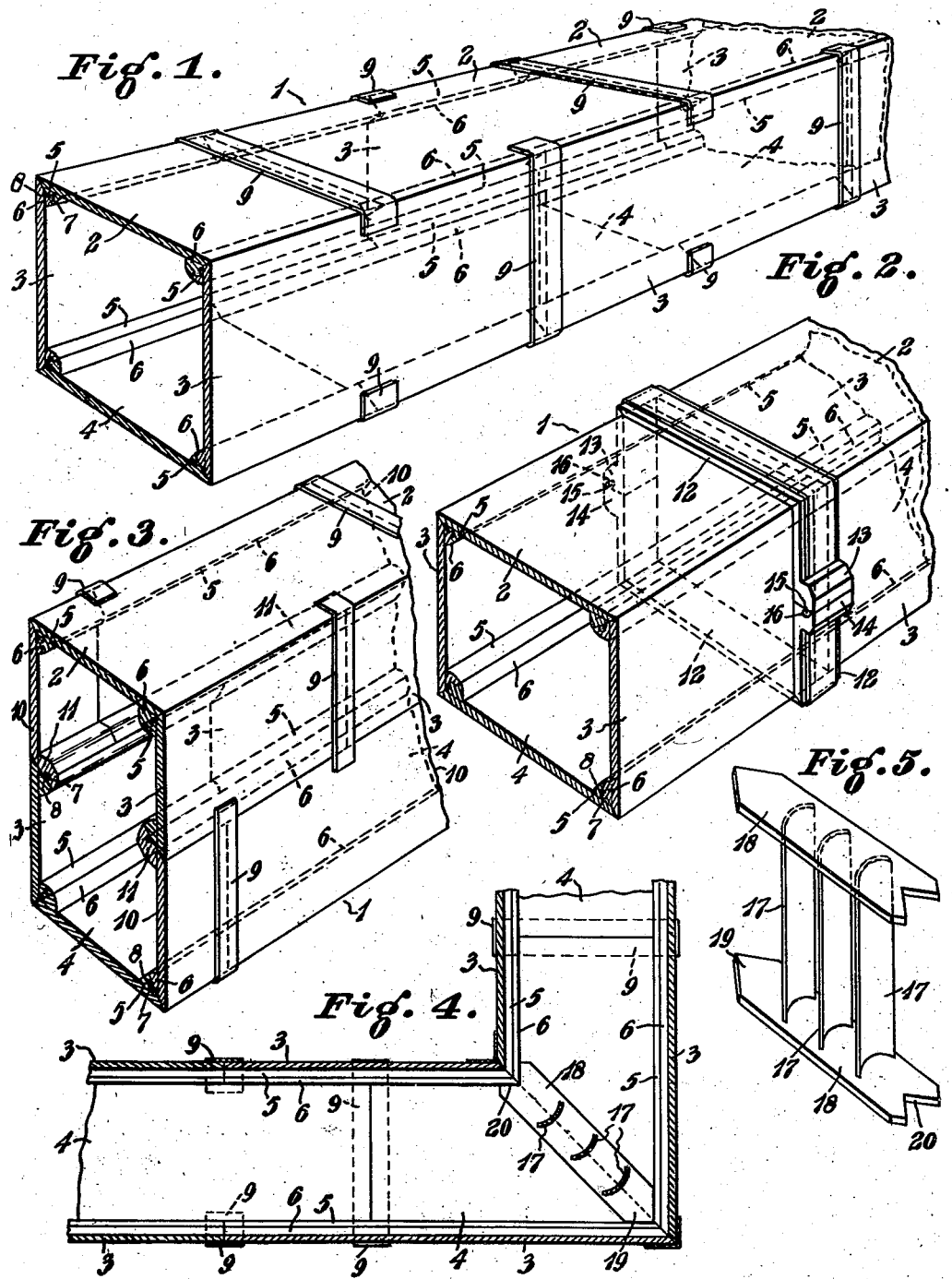

Patented Mar. 19, 1946

2,396,826

UNITED STATES PATENT OFFICE 2,396,826

AIR CONDUIT

William D. Callan, Norwood, Ohio, assignor to The Philip Carey Manufacturing Company, a corporation of Ohio Application January 26, 1942, Serial No. 428,224

6 Claims. (Cl. 138—75)

This invention relates to conduits, particularly air conduits for use in air conditioning or ventilating systems, which are composed of boards that may be readily assembled into conduits of different sizes without fastening, except cement for sealing the joints, other than interlocking means provided on the longitudinal edges of the boards. The conduit is assembled from flat boards which may be readily arranged in piles or stacks for handling and shipment, and then assembled on the job to form the conduit, thereby avoiding shipment of the assembled conduits or sections thereof which are bulky and cumbersome for packing and handling. The invention is particularly suitable for conduits which are made from non-metallic material such as laminated boards of asbestos paper or boards formed from moldable compositions.

For a better understanding of the invention, reference may be made to the accompanying drawings in which:

Fig. 1 is a perspective view of a conduit embodying the invention;

Fig. 2 is a perspective view showing a modified form of sealing strip for the end joints of the sections;

Fig. 3 is a perspective view of a modified form of the invention;

Fig. 4 is a longitudinal cross-sectional view of a conduit having an elbow therein;

Fig. 5 is a perspective view of a duct turn or vane unit which is adapted to be installed along the diagonal of the elbow;

Fig. 6 is a perspective view of one of the side boards of the conduit;

Fig. 7 is a detail of a cross-sectional view of a corner of the conduit;

Fig. 8 is a perspective view of an extension side board for enlarging the cross section of a conduit;

Fig. 9 is a perspective view of a conduit with parts broken away showing a side of the conduit with the extension piece associated with the side board;

Fig. 10 is a cross sectional view of the jointing of the side board and extension board;

Figs. 11, 13 and 14 are modified forms of conduit corners; and

Fig. 12 is a modified form of jointing for the two side boards.

Referring to the drawings in which like numerals are used to designate like parts, numeral 1 designates generally a conduit comprising the top, side and bottom boards 2, 3 and 4. Each of these strips is formed from any suitable composition material.

Conduits are commonly made of asbestos sheets superposed in a laminated structure or from an asbestos-cement composition molded or otherwise pressed into form. This invention does not pertain to the material from which the conduits are made, but to their structure and manner of assembly.

The longitudinal edges of the boards are provided with joining strips 5 and 6 which may be either integrally formed with the board or separately made and attached thereto by any suitable fastening means, such as screws or cement. The top, bottom and side strips are of the same construction, thereby permitting them being used for any side of the conduit. Each is provided with a strip 5 on one edge having a longitudinal groove 7 therein. The strip 6 on the other edge is provided with longitudinal tongue 8 so that when the boards are assembled a tongue on one marginal edge will seat in the groove of the adjacent member to form a corner, the edge of the board and the faces of the strips 5 and 6 being beveled at an angle of about 45 degrees.

In order that members may be retained in assembled relation without other fastening means, the tongue and grooves are preferably of the interlocking type. At the time that the side members are assembled, cementing material, preferably that which is resistant to water and moisture, is advantageously applied along the longitudinal edges so that the longitudinal joints at the corners will be air sealed. The cement also more securely bonds the sides together. An asbestos cement is particularly suitable.

The sides may be assembled so that the end joints between the boards are staggered with the end joints between the boards in an adjacent side (Fig. 1) or the end joints may be arranged so that they are flush, thereby providing a continuous annular joint (Fig. 2). The end joints may also be preferably sealed with the same kind of cement which is used to seal the longitudinal joint. Or they may be covered with an adhesive canvas or paper sealing strip 9 in lieu of or in addition to the cement seal. The sealing strip may just cover the joint in case the joints are staggered or may encircle the pipe.

An extension side board 10 may be provided either for the sides or the top and bottom in order to provide pipes of larger cross section. This extension piece is of the same construction as the regular side boards but with the strip 11 complementary with the strip of the regular side board.

The joint sealing means may also be constructed in complemental sections, such as half-sections 12, with strips 13 on one edge mating with strips 14 on the edge of the other sections, tongues and grooves 15 and 16 being provided. The sections may be applied around the pipe and assembled without any fastening means other than the tongues and grooves formed adjacent the abutting edges of the complementary sections. The sections of the sealing member may be of any material.

Duct vanes or turns 17 are preferably assembled into a unit by means of spaced apart side supports 18 on which the vanes are mounted in any suitable manner. The side supports on one end are tapered at 19 to fit in one corner of the elbow, and on the opposite end have a triangular recess 20 to abut the opposite corner of the elbow across the diagonal. At the point where the duct vane unit is installed, it is only necessary to cut away portions of the edging strips from the side members sufficient to accommodate the width of the end pieces or they may abut the edging strips without cutting any portion away, as shown. The duct turn or vane unit can be installed without any other fastening means. The tongue and groove strips, as above stated, may be attached to the edges of the boards in any suitable manner. They may be attached so as to be concealed within the conduit when same is assembled (Figs. 1, 10 and 14). They may be constructed to themselves form the corner of the conduit. In this construction the outer side of the strips 5a and 6a are recessed at 21 for receiving and seating therein the edge of the board (Figs. 11 and 13). So, too, the strips 10a which join the regular side board member with the extension side board member may likewise be recessed (Fig. 12) to receive the ends of the board. The grooves and tongues may have other shapes, as for example, at 7a, 8a (Fig. 13) or 7b, 8b (Fig. 14).

While I have described in detail certain embodiments typifying the invention, it will be understood that there may be various changes in details of construction. Any form of tongue and groove may be used and the boards may be of any material.

I claim:

1. An air conduit for conveying air in air conditioning and ventilating systems comprising composition boards for forming enclosing walls of the conduit and having strips provided along the margins of their longitudinal side edges, complementary tongues and grooves provided in adjacent strips for permitting the boards being readily assembled, and water resistant cement applied to the tongues and grooves for sealing the joints of the assembled strips.

2. An air conduit for conveying air in air conditioning and ventilating systems comprising composition boards for forming enclosing walls of the conduit and strips provided along the side margins of each of the longitudinal side edges of the boards, said strips having a face surface disposed at about a forty-five degree angle, a tongue provided in one of the strips and a complementary groove formed in the other strip, said tongues and grooves permitting the boards being readily assembled, and water resistant cement applied to the tongues and grooves for sealing the joints of the assembled strips.

3. An air conduit for conveying air in air conditioning and ventilating systems comprising composition boards for forming enclosing walls of the conduit and strips attached to the side margins of each of the longitudinal side edges of the boards, said strips having a face surface disposed at about a forty-five degree angle, a tongue provided in one of the edge strips and a complementary groove formed in the other edge strips, said tongue and grooves permitting the boards being readily assembled into a conduit with the strips cooperating to provide reenforced corners.

4. A rectangular air conduit for conveying air in air conditioning and ventilating systems comprising composition boards disposed in end to end relation for forming each of the enclosing side walls of the conduit, strips provided along the margins of the longitudinal edges of the boards to reenforce the corners of the conduits, complementary tongues and grooves provided in adjacent strips for permitting the boards being readily assembled, and means for sealing the end joints between the boards in the side walls.

5. A rectangular air conduit for conveying air in air conditioning and ventilating systems comprising composition boards disposed in end to end relation for forming each of the enclosing side walls of the conduit, strips provided along the margins of the longitudinal edges of the boards to reenforce the corners of the conduits, complementary tongues and grooves provided in adjacent strips for permitting the boards being readily assembled, and water resistant cement applied to the tongues and grooves for sealing the corner joints between the side walls.

6. An air conduit elbow composed of sections disposed in end to end relation and a duct turn or vane unit mounted entirely within said elbow comprising a plurality of duct turns or vanes mounted between spaced apart flat plate end supports, which bridge and break joint with and secure together the end to end disposed sections of the elbow, said end supports being equal in length to the diagonal width of the elbow between two of the opposite corners of the inside wall and having one end pointed and the opposite end recessed for snugly fitting between said opposite corners on the diagonal of the elbow.

WILLIAM D. CALLAN.